UNITED STATES PATENT OFFICE.

PROSPER JEAN AUGUSTE MAIGNEN, OF PHILADELPHIA, PENNSYLVANIA.

ANTISEPTIC.

1,086,339.      Specification of Letters Patent.      Patented Feb. 3, 1914.

No Drawing. Original application filed March 29, 1909, Serial No. 486,334. Divided and this application filed July 11, 1913. Serial No. 778,428.

*To all whom it may concern:*

Be it known that I, PROSPER JEAN AUGUSTE MAIGNEN, a citizen of France, and resident of Philadelphia, in the State of Pennsylvania, have invented a certain new and useful Improvement in Antiseptics, whereof the following is a specification.

This is a division of my application Serial No. 486,334 filed March 29th, 1909 for Letters Patent of the United States; the claims of said application being limited to the composition of matter used as hereinafter described in the process herein claimed.

It is the object of my invention to destroy parasitic microörganisms, particularly on living tissue without injuring the latter, by progressively evolving sodium hydroxid contiguous to said tissue, from and in a moist mixture of calcium hydroxid, sodium carbonate, aluminum sulfate and boric acid, which, with the products of their reaction, limit and control the action of said evolved sodium hydroxid, whereby the growth of such organisms is inhibited and their substance dissolved without deleterious effect upon contiguous healthy tissue.

The means for progressively evolving sodium hydroxid, in accordance with my invention, include a primarily dry powdered mixture of calcium hydroxid, sodium carbonate, boric acid and aluminum sulfate, which may be mixed in various proportions. Said substances are capable of existing, in dry mixture, without chemical reaction upon each other, but in the presence of moisture, for instance, water, wound fluids, or phlegm, they react upon each other with the result above described. However, substances of equivalent characteristics may be employed. For instance, calcium oxid, soda-ash, borax and alum. It is also to be understood that in some cases it is desirable to omit one or the other of said substances, while in other cases I may add to the mixture some inert substance, incapable of destroying the active principles of the chief ingredients aforesaid. For instance, when a wound has been sterilized by my antiseptic it may be desirable to fill the cavity with a dusting powder of less active power, as a dressing, in which case the original mixture may be diluted with calcium carbonate or other inert substance, which has no other effect in the premises than to act as a diluent for the antiseptic. In preparing my antiseptic for dental purposes I prefer to dilute the mixture with three times its weight of calcium carbonate or other such inert substance.

It may be microscopically observed that my antiseptic has the effect of progressively dissolving the microörganisms, by first disintegrating the outer shells thereof, thus freeing their contents consisting of small round cells which then separate in the field of vision and disappear as they are dissolved. My antiseptic has a similar disintegrating effect upon the broken down tissues and pus cells. On the contrary it has a distinctively beneficial bio-chemical or tonic influence on contiguous and adjacent healthy tissues. Therefore, said antiseptic may be applied with particular advantage wherever there is a lesion or body fluids out of place exposed to bacterial infection or already infected. Said mixture may be applied to the injured tissues, either as a dry powder or as an aqueous mixture at various degrees of dilution, in accordance with the location and nature of the injury.

For application to the air passages in the nose, throat, and lungs, in cases of pulmonary phthisis, pneumonia, catarrh and other parasitic disturbances so located that the air alone can be used as a vehicle to reach the injured part, the mixture in the form of dry powder may be diluted by air, in which it is agitated in any convenient manner and inhaled. Thus applied the fine particles of the mixture settle upon the abnormal secretions or on the injured membrane. The moisture from the latter progressively dissolves the different elements of the mixture. The resultant nascent products liquefy, in part, the viscous albuminoid matter and destroy (by dissolution) the microörganisms, pus cells, and other abnormal proteid matter. Said antiseptic may also be used as an aqueous mixture in varying proportions, conveniently from one-half to five per cent. of the active elements, according to the nature, condition and location of the tissues to which it is to be applied. The weakest aqueous mixture may be employed when dealing with delicate tissues, nasal, labial, conjunctival and other sensitive membranes; the strongest solution may be employed for serious injuries such as ulcers, abscesses and cancerous growths.

I do not desire to limit myself to the precise proportions or methods of application of my antiseptic above described, as it is obvious that various modifications may be made therein without departing from the essential features of my invention as defined in the appended claims.

I claim:—

1. A process for destroying microörganisms on living tissue, without injuring the latter, which consists in progressively evolving sodium hydroxid contiguous to said tissue, from and in a mixture of calcium hydroxid, sodium carbonate, boric acid, aluminum sulfate and moisture, which, with the products of their reaction, limit and control the action of said evolved sodium hydroxid; whereby the growth of such organisms is inhibited and their substance dissolved without deleterious effect upon contiguous healthy tissue.

2. A process for destroying microörganisms on living tissue, without injuring the latter, which consists in progressively evolving sodium hydroxid contiguous to said tissue.

3. A process for progressively evolving sodium hydroxid, including the step of maintaining moist a mixture of calcium hydroxid, sodium carbonate, boric acid, and aluminum sulfate.

In testimony whereof, I have hereunto signed my name at Philadelphia, Pennsylvania, this ninth day of July, 1913.

PROSPER JEAN AUGUSTE MAIGNEN.

Witnesses:
ANNA MARIE KANE,
THOMAS BUTTERWORTH HARRISON.